(12) United States Patent
Lin et al.

(10) Patent No.: US 10,298,677 B2
(45) Date of Patent: *May 21, 2019

(54) HIERARCHICAL STRUCTURES OF ONLINE COMPUTATION FOR CONNECTED VEHICLES

(71) Applicant: TOYOTA JIDOSHA KABUSHIKI KAISHA, Toyota-shi, Aichi-ken (JP)

(72) Inventors: Chung-Wei Lin, Sunnyvale, CA (US); BaekGyu Kim, Cupertino, CA (US); Shinichi Shiraishi, San Jose, CA (US)

(*) Notice: Subject to any disclaimer, the term of this patent is extended or adjusted under 35 U.S.C. 154(b) by 239 days.

This patent is subject to a terminal disclaimer.

(21) Appl. No.: 15/173,958

(22) Filed: Jun. 6, 2016

(65) Prior Publication Data

US 2017/0353548 A1 Dec. 7, 2017

(51) Int. Cl.
*G06F 15/16* (2006.01)
*H04L 29/08* (2006.01)

(52) U.S. Cl.
CPC .......... *H04L 67/1076* (2013.01); *H04L 67/10* (2013.01); *H04L 67/12* (2013.01); *H04L 67/2842* (2013.01)

(58) Field of Classification Search
None
See application file for complete search history.

(56) References Cited

U.S. PATENT DOCUMENTS 9,791,864 B2 * 10/2017 Lei ..................... G05D 1/0214
9,824,283 B2 * 11/2017 Koo ................... G06K 9/00798
9,867,118 B2 * 1/2018 Silver ................... H04W 48/04
9,916,496 B2 * 3/2018 Vandonkelaar ......... G06T 7/246
9,919,715 B2 * 3/2018 Tseng ..................... B60K 35/00
9,969,320 B2 * 5/2018 Kim ....................... B60Q 1/085
2003/0182425 A1 * 9/2003 Kurakake ........... H04L 67/1002
709/226
2004/0088412 A1 * 5/2004 John ................. G06F 17/30017
709/226

(Continued)

OTHER PUBLICATIONS

USPTO, Non-final Office Action for U.S. Appl. No. 15/162,354, dated Dec. 5, 2017, 17 pages.

(Continued)

*Primary Examiner* — Brian Whipple
*Assistant Examiner* — Gregory P Tolchinsky
(74) *Attorney, Agent, or Firm* — Burbage Law, P.C.; Jon-Michael Burbage; Elizabeth Ruzich

(57) ABSTRACT

The disclosure includes implementations for executing one or more computations for a vehicle. Some implementations of a method for a vehicle may include identifying one or more computations as being un-executable by any processor-based computing device of the vehicle. The method may include generating a query including query data describing the one or more computations to be executed for the vehicle. The method may include providing the query to a network. The method may include receiving a response from the network. The response may include solution data describing a result of executing the one or more computations. The response may be provided to the network by a processor-based computing device included in a hierarchy of processor-based computing devices that have greater computational ability than any processor-based computing devices of the vehicle.

22 Claims, 7 Drawing Sheets

(56) References Cited

U.S. PATENT DOCUMENTS

| | | | | |
|---|---|---|---|---|
| 2014/0350749 A1* | 11/2014 | Kwak | ................ | B60R 16/0231 |
| | | | | 701/2 |
| 2015/0100504 A1* | 4/2015 | Binion | ............... | G06O 30/0278 |
| | | | | 705/306 |
| 2016/0285992 A1* | 9/2016 | Katsev | ............... | H04L 67/2842 |
| 2017/0174180 A1* | 6/2017 | Hoyos | .................... | B60R 25/25 |
| 2017/0336802 A1 | 11/2017 | Lin et al. | | |

OTHER PUBLICATIONS

Metzner, et al., "RTSAT—An Optimal and Efficient Approach to the Task Allocation Problem in Distributed Architectures," Proceedings of the 27th IEEE International Real-Time Systems Symposium (RTSS'06), 2006.

Zheng, et al., "Definition of Task Allocation and Priority Assignment in Hard Real-Time Distributed Systems," 28th IEEE International Real-Time Systems Symposium, pp. 161-170, 2007.

Bate, et al., "Incorporating Scenarios and Heuristics to Improve Flexibility in Real-Time Embedded Systems," Proceedings of the 27th IEEE International Real-Time Systems Symposium (RTSS'06), 2006.

USPTO, Final Office Action for U.S. Appl. No. 15/162,354, dated Jul. 13, 2018, 20 pages.

USPTO, Non-Final Office Action for U.S. Appl. No. 15/162,354, dated Nov. 13, 2018, 9 pages.

* cited by examiner

Relative Processing Power and Average Expense for Processor-Based Computing Device

- $N^{th}$ Level > Third Level > Second Level > First Level

HIERARCHICAL STRUCTURES OF ONLINE COMPUTATION FOR CONNECTED VEHICLES

BACKGROUND

The specification relates to providing computations for connected vehicles.

Vehicles have more and more functions or applications which may require intensive computation. However, vehicles themselves may not have sufficient computational ability to execute one or more computations due to the high cost of a powerful computational unit.

SUMMARY

Described are implementations that include a system, method and computer program product for a manager of a connected vehicle to determine whether a computation will be determined by a processor-based computing device of the vehicle itself or another a processor-based computing device that is communicatively coupled to the vehicle via a wireless network. For example, the manager may determine that the computation will be provided by a cloud server, roadside unit ("RSU"), or some other processor-based computing device that is communicatively coupled to the vehicle via the wireless network, which may be referred to herein as a "extra-vehicle computational unit" or "EVCU" if referred to in the singular or "extra-vehicle computational units" or "EVCUs" referred to in the plural The EVCUs may be arranged in a hierarchy. For example, the vehicle itself may be referred to as "level 1." The next level up may include an EVCU that has may more computational power than any processor-based computing device of the vehicle itself; this level and the one or more EVCUs included in it may be referred to as "level 2." The hierarchy may include yet another level referred to as "level 3." Level 3 may include one or more EVCUs that have more computational power than any of the processor-based computing devices included in level 1 or level 2. The hierarchy may include any positive whole number of levels, with each level including more computational power than the levels which precede it in the hierarchy.

For example, the hierarchy may include 1000 levels, and the processor-based computing devices included in level 1000 may include more computational power than any of the processor-based computing devices included in levels 1 through 999. Similarly, the processor-based computing devices included in level 999 in this example may have more computing power than any other the other processor-based computing devices included in levels 1-998. This pattern may be repeated for each level all the way down to level 2 which includes processor-based computing devices having more computational power than the processor-based computing devices of the vehicle itself (i.e., level 1).

The vehicle may include a level 1 manager. The level 1 manager may be operable to analyze a computation and determine whether a processor-based computing device of the vehicle will execute the computation (e.g., the computation will be executed at level 1) or whether the computation will be elevated up the hierarchy to a higher level where it may be executed by a processor-based computing device having more computational power than those available at level 1.

For example, the level 1 manager may determine that a computation may be executed by a level 2 device. The manager may generate a query including data that describes the computation. The level 1 manager may transmit the query to the wireless network. A processor-based computing device included in level 2 may receive the query from the wireless network. The processor-based computing device included in level 2 may include a level 2 manager. The level 2 manager may analyze the computation included in the query and determine whether a processor-based computing device of level 2 will execute the computation (e.g., the computation will be executed at level 2) or whether the computation will be elevated up the hierarchy to a higher level where it may be executed by a processor-based computing device having more computational power than those available at level 2. This process may continue until the computation is solved.

For example, assume that the computation is solved at level 2. The level 2 manager may determine a response for the query that includes a result associated with the computation. For example, the computation may have included a mapping problem (e.g., which electronic control unit of the vehicle should handle an operation) and the response may include a solution to the mapping problem. The solution may be included in the response to the query. The solution may include one or more bits of data that identify it as a response to the query (e.g., one or more bits included in the header of the solution message that uniquely identify the query).

An example implementation of an operating environment including an example hierarchy for providing EVCU-sourced responses for computations for connected vehicles is described herein. For example, FIG. 1A includes an example hierarchical structure according to some implementations. Referring to FIG. 1A, the first level server, second level server and Nth level server (where "N" indicates any positive whole number greater than one) may be maintained or operated by an original equipment manufacturer (OEM) associated with the vehicle or a third-party that is trusted by the vehicle manufacturer or the OEM.

In some implementations, the communicative coupling from the vehicle to the upper-level devices must be a wireless connection such as 3G, 4G, LTE, VoLTE, Wi-Fi™, Bluetooth™, Dedicated Short-Range Communication (DSRC), or full-duplex wireless communication as described in U.S. patent application Ser. No. 14/471,387 filed on Aug. 28, 2014 and entitled "Full-Duplex Coordination System," the entirety of which is herein incorporated by reference.

An example implementation of a method for providing EVCU-sourced responses for computations for connected vehicles is described herein. For example, FIG. 3 includes an example method according to some implementations. Referring to FIG. 3, each manager present in a level (including those present in the vehicle), when it receives a query, it first evaluates and chooses to execute the computation at the current level or push the computation to an upper-level. The computation is pushed to an upper level until a manager chooses to execute it. When a processor-based computing devices executes the computation, the manager for that level (or that processor-based computing device) returns the solution via one or more paths to the vehicle from which the computation originated. In an example scenario, the computation is pushed to the top-level and executed by a processor-based computing device present at that level, and the solution for that computation is returned via one path from the top-level back to the vehicle. An example 405 of a path is depicted in FIG. 4.

In some implementations, a manager decides the location of a computation (executing the computation at the present level or pushing the computation to an upper-level) according to (1) a timing requirement of the computation itself and (2) a timing analysis which depends on the computational ability of each processor-based computing device and the overhead of communication between two or more processor-based computing devices. The timing analysis may also depend at least in part on a moving prediction of the vehicle. Examples of a timing analysis are shown in FIG. 4 (elements 410 and 415) according to some implementations.

In some implementations, a solution for a computation may need to be returned to a vehicle via multiple paths. This is because the vehicle is moving, and it is possible that the original connection from the vehicle to an upper-level processor-based computing device is interrupted and replaced by a new connection from the vehicle to another upper-level processor-based computing device. If multiple upper-level processor-based computing devices are possible, the solution may be distributed to them and then returned to the vehicle.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system including: a first manager of a vehicle that is operable to generate a query including query data describing a mapping problem including one or more questions about which of one or more electronic control units of the vehicle should execute one or more functions of the vehicle, where the first manager is communicatively coupled to a network and transmits the query to the network; and a second manager of a server that is communicatively coupled to the network and operable to receive the query including the query data and determine solution data describing a mapping solution for the mapping problem described by the query data; where the second manager is present in a hierarchy of extra-vehicle computational units that are available to the vehicle when the first manager identifies a mapping problem which is not capable of being solved by any processor-based computing devices of the vehicle; where the mapping solution describes which of the one or more electronic control units should execute the one or more computations; where the second manager is communicatively coupled to a cache that includes a non-transitory memory; where the mapping problem was previously solved by the second manager prior to receipt of the query and the solution data that solves the mapping problem was previously stored in the cache; where, responsive to receipt of the query, the second manager is operable to (1) analyze the query data included in the query to determine that the mapping problem described by the query data was previously solved by the second manager, (2) retrieve the solution data from the cache, (3) generate a response that includes the solution data and (4) transmit the response to the network; and where the first manager receives the response from the network and maps the one or more computations to the one or more electronic control units as described by the mapping solution. Other embodiments of this aspect include corresponding computer systems, apparatus, and computer programs recorded on one or more computer storage devices, each configured to perform the actions of the methods.

One general aspect includes a system including: a first manager of a vehicle that is operable to generate a query including query data describing one or more computations to be executed for the vehicle, where the first manager is communicatively coupled to a network and transmits the query to the network; and a second manager of a server that is communicatively coupled to the network and included in a hierarchy of devices that are available to execute computations for the vehicle; where the second manager is operable to determine whether to execute the one or more computations described by the query data or forward the query to a higher level in the hierarchy; where, responsive to determining to execute the one or more computations, the second manager (1) executes the one or more computations, (2) determines solution data describing a result of executing the one or more computations, (3) generates a response that includes the solution data describing the result and (4) transmits the response to the network; and where the first manager receives the response from the network. Other embodiments of this aspect include corresponding computer systems, apparatus, and computer programs recorded on one or more computer storage devices, each configured to perform the actions of the methods.

Implementations may include one or more of the following features. The system where the vehicle is an autonomous vehicle and the one or more computations are associated with a vehicle control system that makes the vehicle autonomous. The system where the vehicle includes an Advanced Driver Assistance System and the one or more computations are associated with the Advanced Driver Assistance System. The system where the server is an element of a roadside unit. The system where the second manager determines whether to execute the one or more computations described by the query data or forward the query to a higher level in the hierarchy based on a timing analysis that includes (1) determining a first time value describing how long it would take the second server to transmit the query to the higher level and the vehicle to receive the response from the higher level, (2) determining a second time value describing how long it would take for the second server to provide the response to the vehicle and (3) comparing the first time value and the second time value to a timing requirement associated with the one or more computations to determine whether the one or more computations are executed or forwarded. The system where the timing requirement includes a timing threshold that describes how quickly the response should be received by the vehicle. The system where the one or more computations are related to a mapping problem including one or more questions about which of one or more electronic control units of the vehicle should execute the one or more computations of the vehicle and execution of the one or more computations yields a mapping solution that describes which of the one or more electronic control units of the vehicle should execute the one or more computations of the vehicle. The system where the first manager receives a response from the network that includes the mapping solution and the first manager maps the one or more computations to the one or more electronic control units as described by the mapping solution. Implementations of the described techniques may include hardware, a method or process, or computer software on a computer-accessible medium.

One general aspect includes a computer program product including a non-transitory memory of a vehicle storing computer-executable code that, when executed by a processor of the vehicle, causes the processor to: identify one or more computations as being un-executable by any processor-based computing device of the vehicle; generate a query including query data describing the one or more computations to be executed for the vehicle; provide the query to a network; and receive a response from the network, where the response includes solution data describing a result of executing the one or more computations and the response was provided by a processor-based computing included in a hierarchy of processor-based computing devices that include greater computational ability than any processor-based computing devices of the vehicle. Other embodiments of this aspect include corresponding computer systems, apparatus, and computer programs recorded on one or more computer storage devices, each configured to perform the actions of the methods.

Implementations may include one or more of the following features. The computer program product where the one or more computations are identified as being un-executable because they exceed the computational ability of each of the processor-based computing devices of the vehicle. The computer program product where the one or more computations are identified as being un-executable because they cannot be executed by any of the processor-based computing devices of the vehicle within a timing threshold associated with the one or more computations. The computer program product where the one or more computations are associated with a vehicle control system of the vehicle. The computer program product where the response is received by the vehicle in substantially real time relative to when the query was transmitted to the network. The computer program product where the response is received by the vehicle in substantially real time relative to when the one or more computations were identified. Implementations of the described techniques may include hardware, a method or process, or computer software on a computer-accessible medium.

One general aspect includes a method of executing a computation for a vehicle using a hierarchy of processor-based computing devices that are available to the vehicle, the method including: identifying one or more computations as being un-executable by a processor-based computing device of the vehicle; generating a query including query data describing the one or more computations to be executed for the vehicle; providing the query to a network; and receiving a response from the network, where the response includes solution data describing a result of executing the one or more computations and the response including the solution data describing the result was provided to the network by a processor-based computing device included in a hierarchy of processor-based computing devices that include greater computational ability than the processor-based computing device of the vehicle. Other embodiments of this aspect include corresponding computer systems, apparatus, and computer programs recorded on one or more computer storage devices, each configured to perform the actions of the methods.

Implementations may include one or more of the following features. The method where the one or more computations are identified as being un-executable because they exceed the computational ability of the processor-based computing device of the vehicle. The method where the one or more computations are identified as being un-executable because they cannot be executed by the processor-based computing device of the vehicle within a timing threshold associated with the one or more computations. The method where the hierarchy includes a plurality of layers and each successive layer includes greater computational ability than one or more preceding layers in the hierarchy. The method where the hierarchy is only available to vehicles having a particular manufacturer associated with the vehicle. The method where the manufacturer is an original equipment manufacturer that is associated with the vehicle because it manufactured a component of the vehicle. The method where the query includes one or more bits of data that indicate the manufacturer associated with the vehicle, thereby providing the vehicle with access to the hierarchy. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 1B is a block diagram illustrating relative processor power and average expense for processor-based computing devices in a hierarchy according to some implementations.

DETAILED DESCRIPTION

Figure 1A:
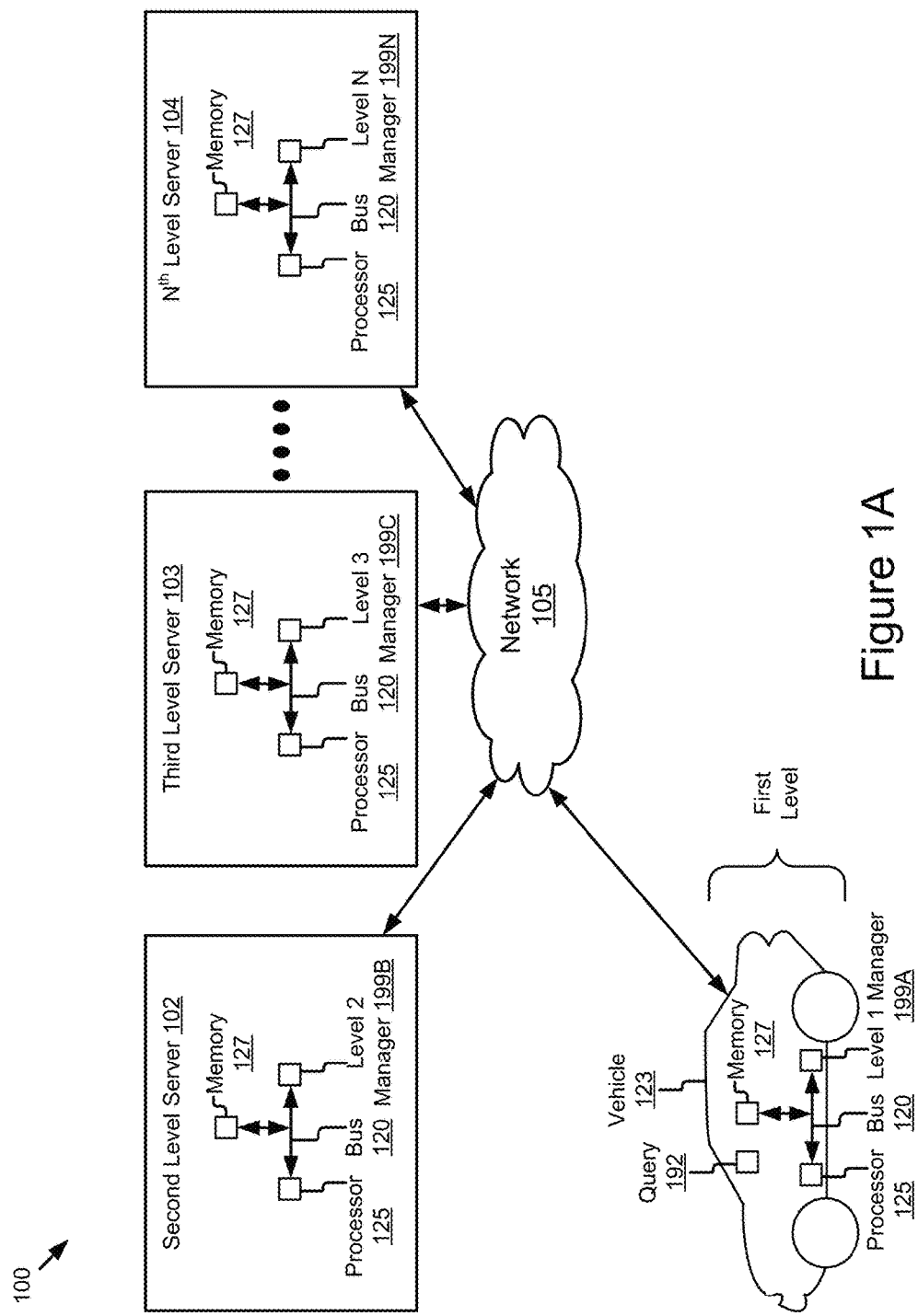
FIG. 1A is a block diagram illustrating an operating environment for a plurality of managers according to some implementations.

FIG. 1A is a block diagram illustrating an operating environment 100 for a plurality of managers 199A, 199B, 199C, 199N (referred to herein collectively as a "manager 199" or individually as a "level 1 manager 199A," a "level 2 manager 199B," a "level 3 manager 199C" and an "Nth manager 199N") according to some implementations.

The operating environment includes an example hierarchy. For example, the bottom level of the hierarchy may include level 1 which includes the vehicle 123.

The next level of the hierarchy may include level 2 which includes the second level server 102. The second level server 102 is shown by way of example as the hierarchy may include any positive whole number of second level servers 102 included in level 2. Each of the second level servers 102 may include more processing power or computational power than the processor-based computing devices present in the vehicle 123.

The next level of the hierarchy may include level 3 which includes the third level server 103. The third level server 103 is shown by way of example as the hierarchy may include any positive whole number of third level servers 103 included in level 3. Each of the third level servers 103 may include more processing power or computational power than the processor-based computing devices present in level 1 and level 2.

The next level of the hierarchy may include level N which includes a Nth level server 104. In this example the letter "N" indicates any positive whole number greater than three.

The Nth level server 104 is shown by way of example as the hierarchy may include any positive whole number of Nth level servers 103 included in level N. Each of the Nth level servers 104 may include more processing power or computational power than the processor-based computing devices present in level 1, level 2, level 3 or any other levels lower than the Nth level.

In some implementations, one or more of the levels may include other processor based computing devices of various types so long as the devices are capable of sending and receiving messages to and from the network 105.

For example, level 2 may include one or more processor-based computing devices having similar processing power or computational power. The processor-based computing devices of level 2 may include various types of processor-based computing devices that are capable of sending and receiving messages to and from the network 105. Examples of processor-based computing devices included in level 2 may include a computer, a laptop, a roadside unit ("RSU"), or any other processor-based computing device that is communicatively coupled to the network 105.

The operating environment 100 may include one or more of the following elements: a vehicle 123; a second level server 102; a third level server 103 and a Nth level server 104. These elements of the operating environment 100 may be communicatively coupled to one another via a network 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some implementations, the network 105 may include a peer-to-peer network. The network 105 may also be coupled to or may include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, Dedicated Short Range Communication (DSRC), full-duplex wireless communication (as described in U.S. patent application Ser. No. 14/471,387 filed on Aug. 28, 2014 and entitled "Full-Duplex Coordination System"), etc. The network 105 may also include a mobile data network that may include third-generation (3G), fourth-generation (4G), long-term evolution (LTE), Voice-over-LTE ("VoLTE") or any other mobile data network or combination of mobile data networks. Further, the network 105 may include one or more IEEE 802.11 wireless networks. The network 105 may include a Wi-Fi™ network.

The vehicle 123 may include a car, a truck, a sports utility vehicle, a bus, a semi-truck, a drone or any other roadway-based conveyance that includes a vehicle control system 180.

In some implementations, the vehicle 123 may include an autonomous vehicle or a semi-autonomous vehicle.

In some implementations, the vehicle 123 is a connected vehicle. For example, the vehicle 123 is communicatively coupled to the network 105 and can send and receive messages via the network 105, and this quality may make the vehicle 123 a "connected vehicle."

The vehicle 123 may include one or more of the following elements: a processor 125; a memory 127; a level 1 manager 199A. These elements may be communicatively coupled to one another via a bus 120. The memory 127 may store data or information. For example, the memory 127 may store the query 192.

The processor 125 includes an arithmetic logic unit, a microprocessor, a general purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1A includes a single processor 125, multiple processors may be included. The processor 125 may include a graphical processing unit. Other processors, operating systems, sensors, displays, and physical configurations may be possible.

In some implementations, the processor 125 may be an element of a processor-based computing device of the vehicle 123. For example, the vehicle 123 may include one or more of the following processor-based computing devices and the processor 125 may be an element of one of these devices: an onboard vehicle computer; an electronic control unit; a navigation system; an advanced driver assistance system and a head unit.

In some implementations, the processor 125 may be an element of a computational unit or some other processor-based computing device of the vehicle 123 that may be a candidate to execute a computation associated with the vehicle 123. For example, the processor 125 may be an element of a processor-based computing device included in level 1 of the hierarchy.

The memory 127 may include a non-transitory storage medium. The memory 127 may store instructions or data that may be executed by the processor 125. The instructions or data may include code for performing the techniques described herein. The memory 127 may be a dynamic random access memory (DRAM) device, a static random access memory (SRAM) device, flash memory, or some other memory device. In some implementations, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 1A, the memory 127 stores a query 192. The query 192 may include a message generated by the level 1 manager 199A. For example, the query 192 may include one or more computations that may be solved by a processor-based computing device of a higher level (e.g., level 2, level 3 or . . . level N) of the hierarchy.

The level 1 manager 199A may be operable to analyze one or more computations and determine whether the computation will be executed by a processor-based computing device present at level 1. For example, the level 1 manager 199A may include code and routines that are operable, when executed by a processor of the vehicle 123 such as the processor 125, to determine whether one or more computations are executed by one or more of the following devices present in the vehicle 123: one or more computations units; one or more onboard vehicle computers; one or more electronic control units ("ECU" if singular, "ECUs" if plural"); one or more navigation systems; one or more advanced driver assistance systems; one or more head units;

and one or more processor-based computing devices included in level 1 of the hierarchy.

In some implementations, the level 1 manager 199A may generate the query (such as the query 192) that includes the one or more computations to be executed by a higher level in the hierarchy.

In some implementations, the query may include a problem. The problem may include query data. The query data may include a data set that includes the one or more computations. For example, the query may include a mapping problem. The mapping problem may include a question as to which ECU should execute one or more operations or routines (or manages one or more operations or routines). In some implementations, the query may include some other problem associated with the vehicle 123.

In some implementations, the query may include one or more bits of data that indicate the source of the query. For example, the query may include a unique identifier of the vehicle.

In some implementations, the query may include location data that describes the location of the vehicle 123. In some implementations, the vehicle 123 may include a DSRC-enabled global positioning system (GPS) that retrieves the location data for the vehicle 123 that describes the geographic location of the vehicle 123. The DSRC-enabled GPS unit may be operable to retrieve location data that describes the location of the vehicle 123 with an accuracy of plus or minus 1.5 meters.

The DSRC-compliant GPS unit included in the vehicle 123 may include hardware that wirelessly communicates with a GPS satellite to retrieve location data that describes a location of the vehicle 123. In some implementations, a DSRC-compliant GPS unit is operable to provide GPS data that describes the location of the vehicle 123 to a lane-level degree of precision. The DSRC standard requires that location data be precise enough to infer if two vehicles (such as vehicle 123 and another vehicle on the same roadway as the vehicle 123) are in the same lane. The DSRC-compliant GPS unit may be operable to identify, monitor and track its two-dimensional position within 1.5 meters of its actual position 68% of the time under an open sky. Since lanes of a roadway are typically no less than 3 meters wide, whenever the two dimensional error of the location data is less than 1.5 meters the manager 199 may analyze the location data provided by the DSRC-compliant GPS unit and determine what lane of the roadway the vehicle 123 is traveling in based on the relative positions of vehicles on the roadway (or in the drive-through). The lane of the vehicle 123 or the location of the vehicle may affect the determination of timing calculations described below with reference to FIG. 4.

In some implementations, the level 1 manager 199A may receive a response to the query. The response may include a solution to the mapping problem included in the query. In some implementations, the response may include a solution to the mapping problem or some other problem associated with the vehicle 123.

In some implementations, the level 1 manager 199A may implement the solution included in the response. For example, the level 1 manager 199A may implement the mapping problem by ensuring that the engine control unit identified by the response executes or manages the operation or the routine.

The second level server 102, third level server 103 and the Nth level server 104 include elements similar to those described above with reference to the vehicle 123 and so those descriptions will not be repeated here. For example, the second level server 102, third level server 103 and the Nth level server 104 may include the following elements which are similar to those described above for the vehicle 123: the processor 125; the memory 127 and the bus 120.

The second level server 102 may include a level 2 manager 199B. The level 2 manager 199B may be operable to analyze one or more computations and determine whether the computation will be executed by processor-based computing device present at level 2. For example, the level 2 manager 199B may include code and routines that are operable, when executed by a processor of the second level server 102 such as the processor 125, to determine whether one or more computations are executed by one or more of the following devices present in the second level server 102: one or more computations units; one or more processor cores; and one or more processor-based computing devices included in level 2 of the hierarchy.

In some implementations, the level 2 manager 199B may generate a query that includes the one or more computations to be executed by a higher level in the hierarchy. Optionally, the level 2 manager 199B may forward the original query received from the network 105. For example, the level 2 manager 199B may forward the query to the level 3 manager 199C via the network 105.

In some implementations, the level 2 manager 199A may generate a response to the query. The response may include a solution to the problem included in the query. For example, the response may include solution data that describes the solution to the problem.

The third level server 103 may include a level 3 manager 199C. The level 3 manager 199C may be operable to analyze one or more computations and determine whether the computation will be executed by processor-based computing device present at level 3. For example, the level 3 manager 199C may include code and routines that are operable, when executed by a processor of the third level server 103 such as the processor 125, to determine whether one or more computations are executed by one or more of the following devices present in the third level server 103: one or more computations units; one or more processor cores; and one or more processor-based computing devices included in level 3 of the hierarchy.

In some implementations, the level 3 manager 199C may generate a query that includes the one or more computations to be executed by a higher level in the hierarchy. Optionally, the level 3 manager 199C may forward the original query received from the network 105. For example, the level 3 manager 199C forwards the query to the level N manager 199N via the network 105.

In some implementations, the level 2 manager 199A may generate a response to the query. The response may include a solution to the problem included in the query. For example, the response may include solution data that describes the solution to the problem.

The Nth level server 104 may include a level N manager 190N. The level N manager 199N may be operable to analyze one or more computations and determine whether the computation will be executed by processor-based computing device present at level N. For example, the level N manager 199N may include code and routines that are operable, when executed by a processor of the Nth level server 104 such as the processor 125, to determine whether one or more computations are executed by one or more of the following devices present in the Nth level server 104: one or more computations units; one or more processor cores; and one or more processor-based computing devices included in level N of the hierarchy.

In some implementations, the level N manager 199N may generate a response to the query. The response may include a solution to the problem included in the query. For example, the response may include solution data that describes the solution to the problem.

In some implementations, the Nth level server 104 may be the highest level included in the hierarchy.

In some implementations, the manager 199 may store solutions to problems in a buffer, cache or some other non-transitory memory. For example, the manager 199 may store solution data associated with a problem. In this way, when a manager 199 receives a query including a problem which has been previously solved, the manager 199 may retrieve the solution data associate with that problem from the non-transitory memory more quickly than re-executing the one or more computations included in the query to identify the solution a second time.

In some implementations, the manager 199 may be implemented using hardware including a field-programmable gate array ("FPGA") or an application-specific integrated circuit ("ASIC"). In some other implementations, the manager 199 may be implemented using a combination of hardware and software. The manager 199 may be stored in a combination of the devices (e.g., servers or other devices), or in one of the devices.

The manager 199 is described in more detail below with reference to FIGS. 2, 3, 4 and 5.

In some implementations, the query 192 and the response may be encrypted themselves or transmitted via an encrypted communication provided by the network 105. In some implementations, the network 105 may include an encrypted virtual private network tunnel ("VPN tunnel"). In some implementations, the manager 199 or the manager 199 may include encryption keys for encrypting messages and decrypting messages described herein.

In some implementations, the network 105 may include a DSRC network and the manager 199 may transmit a query 192 to another level of the hierarchy via a DSRC message. In some implementations, a response to the query 192 may be received by the manager 199 via a DSRC message.

In some implementations, a manager 199 may include a full-duplex coordination system as described in U.S. patent application Ser. No. 14/471,387 filed on Aug. 28, 2014 and entitled "Full-Duplex Coordination System," the entirety of which is herein incorporated by reference. For example, the level 1 manager 199A may include a full-duplex coordination system that transmits a full-duplex wireless message to the level 2 manager 199B that includes a mapping problem or some other query. The level 2 manager 199B may include a full-duplex coordination system that transmits a full-duplex wireless message (i.e., the response) to the level 1 manager 199A that includes the mapping solution (or some other solution) that solves the mapping problem (or some other problem).

Referring now to FIG. 1B, depicted is a block diagram illustrating relative processor power and average expense 181 for processor-based computing devices in a hierarchy according to some implementations. In some implementations, the processor-based computing devices may be those that execute the one or more computations included in the query 192 described above with reference to FIG. 1A.

The processor-based computing devices included in the first level (e.g., level 1) may have the least computing power and expense relative to all other processor-based computing devices in the hierarchy. For example, these processor-based computing devices may cost the least in terms of money relative to all other processor-based computing devices included in the hierarchy, but they may also have the least amount of computing power.

The processor-based computing devices included in the second level (e.g., level 2) may have greater processing power (and expense) than those of level 1, but less processor power and expense than those of higher levels in the hierarchy such as the third level (level 3) and the Nth level (level N).

The processor-based computing devices included in the third level (e.g., level 3) may have greater processing power (and expense) than those of level 1 and level 2, but less processor power and expense than those of higher levels in the hierarchy such as the Nth level (level N).

The processor-based computing devices included in the Nth level (e.g., level N) may have greater processing power (and expense) than those of any other level in the hierarchy.

Figure 2:
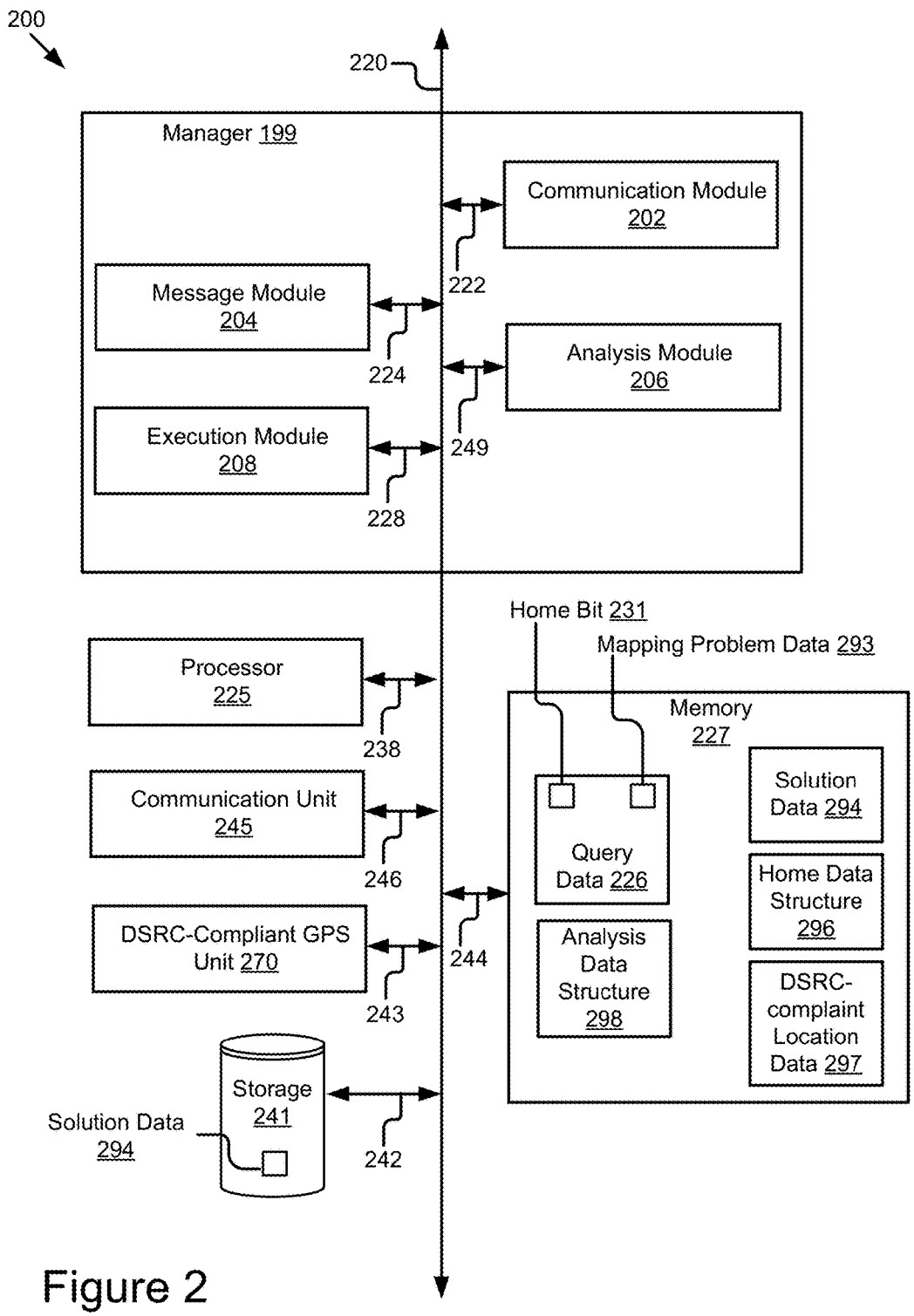
FIG. 2 is a block diagram illustrating an example computer system including a manager according to some implementations.

Referring now to FIG. 2, depicted is a block diagram illustrating an example computer system 200 including a manager 199 according to some implementations.

In some implementations, the computer system 200 may include a special-purpose computer system that is programmed to perform one or more steps of a method 300 described below with reference to FIG. 3.

In some implementations, the computer system 200 may include a special-purpose computer system that is programmed to perform the analysis described below with reference to FIG. 4 or FIG. 6.

In some implementations, the computer system 200 may include a processor-based computing device included in any level of the hierarchy described above with reference to FIG. 1A.

The computer system 200 may include one or more of the following elements according to some examples: the manager 199; a processor 225; a communication unit 245; a DSRC-compliant GPS unit 270; a storage 241; and a memory 227. The components of the computer system 200 are communicatively coupled by a bus 220.

In the illustrated implementation, the processor 225 is communicatively coupled to the bus 220 via a signal line 238. The communication unit 245 is communicatively coupled to the bus 220 via a signal line 246. The DSRC-compliant GPS unit 270 is communicatively coupled to the bus 220 via a signal line 243. The storage 241 is communicatively coupled to the bus 220 via a signal line 242. The memory 227 is communicatively coupled to the bus 220 via a signal line 244.

The processor 225 includes an arithmetic logic unit, a microprocessor, a general purpose controller, or some other processor array to perform computations and provide electronic display signals to a display device. The processor 225 processes data signals and may include various computing architectures including a CISC architecture, a RISC architecture, or an architecture implementing a combination of instruction sets. Although FIG. 2 includes a single processor 225, multiple processors may be included. The processor 225 may include a graphical processing unit. Other processors, operating systems, sensors, displays, and physical configurations may be possible.

The memory 227 stores instructions or data that may be executed by the processor 225. The instructions or data may include code for performing the techniques described herein. The memory 227 may be a DRAM device, a SRAM device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores one or more of the following elements: query data 226; solution data 294; an analysis data structure 298; a home data structure 296; and DSRC-compliant location data 297.

The query data 226 may include digital data that describes one or more computations to be executed. The one or more computations may be elements of a problem. For example, the one or more computations may be an element of a mapping problem. The query data 226 may describe the problem.

In some implementations, the query data 226 may include any data included in a query 192.

In some implementations, the query data 226 may include other digital data including one or more of the following: mapping problem data 293; a home bit 231; DSRC-compliant location data 297; and any of the data described below with reference to FIG. 6 as an input for the manager 199.

The mapping problem data 293 may include digital data that describes a mapping problem (see, e.g., the mapping problem 193 described below with reference to FIG. 5).

The home bit 231 may include one or more bits of digital data that uniquely identify which vehicle 123 originated the query data 226 or the problem described by the query data 226. For example, the home bit 231 may include a unique identifier of the vehicle 123. This vehicle 123 may be the "home" for the problem since this vehicle 123 originated the query data 226 or the problem described by the query data 226. For example, the query data 226 may be generated by the message module 204 of a manager 199 included in the vehicle 123, and in this way the vehicle 123 may have originated the query data 226 or the problem described by the query data 226.

In some implementations, the home bit 231 may be cross-referenced against the home data structure 296 to identify which vehicle 123 is uniquely identified by the home bit 231. For example, the home data structure 226 may include a table or some other data structure which includes one or more home bits 231 and an identity of the vehicle 123 uniquely identified by each of the home bits 231 included in the home data structure 296.

For example, the home data structure 296 may include a table having a first column that includes each home bit 231 collected by the manager 199 in a different row of the first column. The home data structure 296 may further include a second column with rows that correspond to those of the first column. Each row of the second column may describe a vehicle 123 that is identified by the home bit 231 in the corresponding row of the first column. In this way the home data structure 296 may be cross-referenced to identify the vehicle 123 which is uniquely identified by a particular home bit 231.

The analysis data structure 298 may include digital data used to determine whether a particular set of computations (e.g., a query) will be executed by the current level or a higher level. An example of an analysis performed based in part on the analysis data structure 298 is shown in FIG. 6 according to some implementations.

In some implementations, the analysis data structure 298 may include a data structure (e.g., a table, a database, etc.) that includes digital data that identifies one or more of the following: (1) one or more different types of computations, problems or queries (e.g., a mapping problem or some other problem that a vehicle 123 may need solved), (2) the timing requirements for each of these different types of computations, problems or queries and (3) the computational requirements for each of these different types of computations, problems or queries.

For example, the analysis data structure 298 may include a first column that lists different types of problems in different rows of the first column, a second column that lists different timing requirements that are associated with each of the different types of problems in the first column and a third column that lists different computational requirements that are associated with each of the different types of problems in the first column. In this example, the first column is organized based on different types of problems, but in other examples the first column may be organized based on different types of queries or different types of computations.

In some implementations, different types of problems may need to be solved more quickly than other types of problems so that different types of problems may include different timing requirements.

In some implementations, the timing requirement may include data that describes how quickly solution data 294 should be returned by the manager 199 responsive to a particular set of query data 226 or a particular problem or set of computations to be executed.

In some implementations, a timing requirement included in the analysis data structure 298 for a particular type of computation, problem or query may include a timing threshold that describes an amount of time that may lapse before a query receives a response. In this way, the manager 199 may analyze the timing requirement to determine whether the manager 199 has time to push a query to a higher level in the hierarchy or whether the query should be handled or executed by the current level associated with the manager 199.

An example of a problem may include a mapping problem. An example of a timing requirement may include a timing threshold that describes how quickly a mapping problem must be solved and the mapping solution returned to the vehicle.

In some implementations, the timing requirement included in the analysis data structure 298 may include digital data that describes how quickly the vehicle 123 may need a computation set included in a query executed.

In some implementations, the timing requirement included in the analysis data structure 298 may include digital data that describes how quickly the vehicle 123 may need a problem included in a query solved.

In some implementations, the timing requirement included in the analysis data structure 298 may include digital data that describes how quickly the vehicle 123 may need a response returned for a particular query (e.g., a query having a particular type of problem or set of computations).

In some implementations, the timing requirement may be different for the same type of problem, query or computation based on the context of the vehicle 123. For example, if the vehicle 123 is present in a high risk situation (e.g., driving in rain, driving in poor lighting, etc.) then the timing requiring may be shorter so that a response including the solution data 294 is returned more quickly. The query data 226 may include sensor data that describes the context of the vehicle 123. For example, the computer system 200 may include a sensor set that includes one or more sensors that measure the physical environment of the vehicle 123 as sensor data and the sensor data is included in the query so that the context of the vehicle 123 may be determined by the manager 199.

A computational power requirement may include a recommended or necessary amount of computational power for executing one or more computations. For example, a mapping problem may not be capable of solving by a vehicle (level 1), so the computational requirements for the one or more computations which must be executed to solve a mapping problem may include a recommendation for which level of the hierarchy the mapping problem should be transmitted to for execution of the one or more computations. For example, the computational requirement for this type of problem may indicate "level X" which indicates that the query for the mapping problem should be transmitted up to level X in the hierarchy, where X equal any positive whole number greater than one.

The DSRC-compliant location data 297 may include digital data that describes the geographic location of the vehicle 123. The DSRC-compliant location data 297 may describe the geographic location of the vehicle 123 with the precision required by the DSRC standard (e.g., accurate to within plus or minus 1.5 meters). The DSRC-compliant location data 297 may be retrieved from one or more GPS satellites by the DSRC-compliant GPS unit 270.

The solution data 294 may include digital data that describes a solution to a problem described by the query data 226. The problem may include, for example, a mapping problem or some other problem associated with a vehicle 123. The manager 199 may generate a response that includes the solution data 294. The response may include an electronic message that is encoded to include the solution data 294. The response may be wirelessly transmitted to the vehicle 123.

In some implementations, the solution data 294 may include digital data that describes a mapping solution for mapping problem (see, e.g., the mapping solution 194 described below with reference to FIG. 5). The manager 199 may determine the solution data 294 based on the mapping problem data 293. The manager 199 may generate a response that includes the solution data 294. The response may include an electronic message encoded to include the solution data 294.

In some implementations, the solution data 294 may include digital data that describes a result or outcome of executing one or more computations described by the query data 226.

In some implementations, the solution data 294 may include digital data that includes an answer to a query described by the query data 226.

In some implementations, the solution data 294 may include any data that is included in a response. The response may include a message that is responsive to a particular query. The response may be transmitted wirelessly to the network 105 by the communication unit 245.

The communication unit 245 may include hardware that transmits and receives data to and from the network 105. In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with the network 105 or other communication channels using one or more wireless communication methods, including IEEE 802.11, IEEE 802.16, Bluetooth, or another suitable wireless communication method.

In some implementations, the communication unit 245 includes a port for direct physical connection to the network 105 or to another communication channel. For example, the communication unit 245 includes a USB, SD, CAT-5, or similar port for wired communication with the network 105.

In some implementations, the communication unit 245 includes a wireless transceiver for exchanging data with the network 105 or other communication channels using one or more wireless communication methods, including: IEEE 802.11; IEEE 802.16, Bluetooth, EN ISO 14906:2004 Electronic Fee Collection—Application interface EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, millimeter wave, DSRC, etc.

In some implementations, the communication unit 245 includes full-duplex coordination system as described in U.S. patent application Ser. No. 14/471,387 filed on Aug. 28, 2014 and entitled "Full-Duplex Coordination System."

The DSRC-compliant GPS unit 270 may include hardware that wirelessly communicates with a GPS satellite to retrieve DSRC-compliant location data 297 that describes a location of the vehicle 123. In some implementations, a DSRC-compliant GPS unit 270 is operable to provide DSRC-compliant location data 297 that describes the location of the vehicle 123 to a lane-level degree of precision. The DSRC standard requires that location data be precise enough to infer if two vehicles (such as vehicle 123 and another vehicle on the same roadway as the vehicle 123) are in the same lane. The DSRC-compliant GPS unit 270 may be operable to identify, monitor and track its two-dimensional position within 1.5 meters of its actual position 68% of the time under an open sky. Since lanes of a roadway are typically no less than 3 meters wide, whenever the two dimensional error of the DSRC-compliant location data 297 is less than 1.5 meters the manager 199 may analyze the DSRC-compliant location data 297 and determine what lane of the roadway the vehicle 123 is traveling in based on the relative positions of vehicles on the roadway (or in the drive-through). This DSRC-compliant location data 297 may then be used in analysis by one or more managers 199 such as those described below with reference to FIG. 5 or 6.

The storage 241 can be a non-transitory storage medium that stores data for providing the functionality described herein. The storage 241 may be a dynamic random access memory (DRAM) device, a static random access memory (SRAM) device, flash memory, or some other memory devices. In some implementations, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the storage 241 may include a cache storage (herein, a "cache"). The cache may store the solution data 294 (or a subset of the solution data 294). For example, the manager 199 may determine a mapping solution for a mapping problem and store the solution data 294 describing the mapping solution in the cache. In this way, the solution data 294 may be retrieved from the cache the next time the same or similar mapping problem is received in a query or a function set as described below with reference to FIG. 4.

In the illustrated implementation shown in FIG. 2, the manager 199 includes a communication module 202, a message module 204, an analysis module 206 and an execution module 208. These components of the manager 199 are communicatively coupled to each other via the bus 220.

In some implementations, components of the manager 199 can be stored in a single server or device. In some other implementations, components of the manager 199 can be distributed and stored across multiple servers or devices.

The communication module 202 can be software including routines for handling communications between the manager 199 and other components of the computer system 200. In some implementations, the communication module 202 can be a set of instructions executable by the processor 225 to provide the functionality described below for handling communications between the manager 199 and other components of the computer system 200. In some implementations, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the computer system 200 or the network 105. For example, the communication module 202 receives, via the communication unit 245, the query data 226. The query data 226 may be included, for example, in a query. The communication module 202 may send the solution data 294 to the network 105 via the communication unit 245. The solution data 294 may be included, for example, in a response to the query.

In some implementations, the communication module 202 receives data from components of the manager 199 and stores the data in one or more of the storage 241 and the memory 227. For example, the communication module 202 receives the solution data 294 from the execution module 208 and stores the solution data 294 in the storage 241. The communication module 202 may provide the solution data 294 to the message module 204 for generating a response to a query. The response may include the solution data 294 generated based on query data 226 included in the query.

In some implementations, the communication module 202 may handle communications between components of the manager 199 or the computer system 200.

The message module 204 can be software including routines for generating a message such as a query or a response. The message may be encoded to include data. For example, the message module 204 may encode a query to include the query data 226. In another example, the message module 204 may encode a response to include the solution data 294.

The message module 204 may analyze the query data 226 included in a query received from the communication module 202. For example, the message module 204 may analyze the query data 226 included in the query to determine whether the query data 226 includes a problem that has been previously solved so that the solution data 294 for the problem is included in the storage 241 which may be a cache.

In some implementations, the message module 204 can be stored in the memory 227 of the computer system 200 and can be accessible and executable by the processor 225. The message module 204 may be adapted for cooperation and communication with the processor 225 and other components of the computer system 200 via signal line 224.

The analysis module 206 can be software including routines for determining whether a response will be generated by the current level or a different level of the hierarchy. For example, the analysis module 206 may determine whether a problem described by query data 226 received from the communication module 202 will be solved by an execution module 208 of the present level of the hierarchy or an execution module 208 of a higher level of the hierarchy.

An example of the analysis module 206 is described below with reference to FIG. 4 according to some implementations.

If the analysis module 206 determines to have the response generated by a different level of the hierarchy, then the analysis module 206 may send a signal to the message module 204. The signal may indicate or describe the decision of the analysis module 206. Responsive to the signal, the message module 204 may (1) forward the query including the query data 226 to a manager 199 of a different level in the hierarchy or (2) generate a new query including the query data 226 and cause the new query to be transmitted to the manager 199 in the different level of the hierarchy. For example, the message module 204 may work with the communication module 202 to cause the communication unit 245 to forward the query to a manager 199 of a processor-based computing device present in a higher level of the hierarchy.

In some implementations, the memory 227 may store hierarchy data that describes the hierarchy and any data necessary to transmit messages (e.g., the query) successfully to the different managers 199 of the hierarchy. The message module 204, communication module 202 and the communication unit 245 may use the hierarchy data to transmit messages to the different managers 199 of the hierarchy. In some implementations, the memory 227 may store hierarchy data that describes a manager 199 for the next level in the hierarchy and the message module 204 always forwards the query to this manager 199 in the next level of the hierarchy.

If the analysis module 206 determines to have the response generated by the present level of the hierarchy, then the analysis module 206 may send a signal to the execution module 208. The execution module 208 may receive the signal. The signal may indicate or describe the decision of the analysis module 206. The signal may include the query data 226. Responsive to the signal, the execution module 208 may take steps to provide the functionality described below for the execution module 208.

In some implementations, the analysis module 206 can be stored in the memory 227 of the computer system 200 and can be accessible and executable by the processor 225. The analysis module 206 may be adapted for cooperation and communication with the processor 225 and other components of the computer system 200 via signal line 249.

The execution module 208 can be software including routines for generating solution data 294 based at least in part on the query data 226 received from the analysis module 206. For example, the execution module 208 may execute (or cause the processor 225 to execute) the one or more computations included in the query data 226 and thereby generate the solution data 294. If the one or more computations are related to a problem (e.g., a mapping problem), the execution module 208 may execute the one or more computations to identify the solution (e.g., the mapping solution).

The execution module 208 may transmit a signal to the message module 204. The signal may include the solution data 294. The message module 204 may receive the signal. Responsive to receipt of the signal, the message module 204 may generate a response that is encoded to include the solution data 294 included in the signal.

In some implementations, the execution module 208 can be stored in the memory 227 of the computer system 200 and can be accessible and executable by the processor 225. The execution module 208 may be adapted for cooperation and communication with the processor 225 and other components of the computer system 200 via signal line 228.

Figure 3:
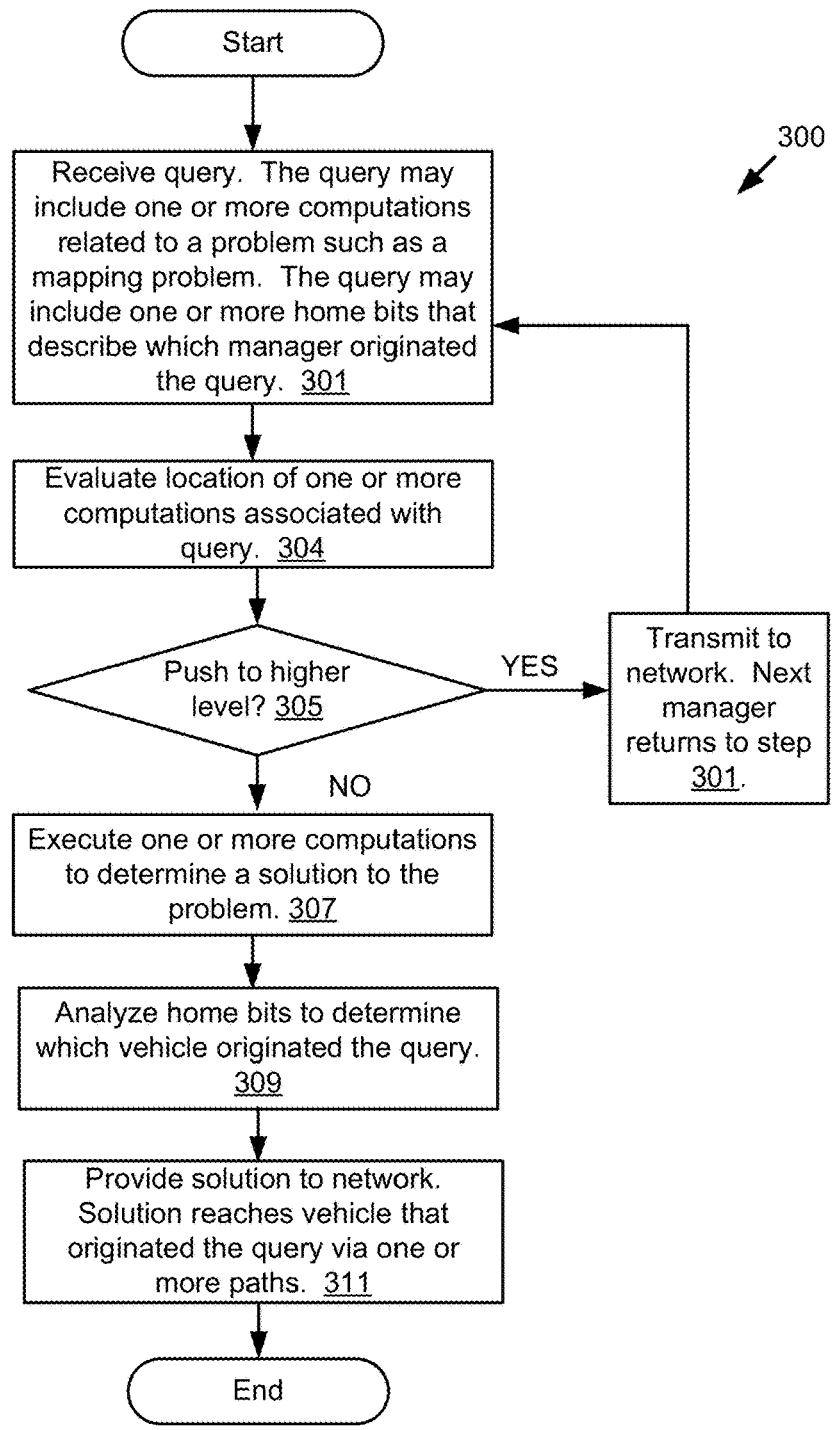
FIG. 3 is a flowchart of an example method for executing a computation for a connected vehicle according to some implementations.

Referring now to FIG. 3, depicted is a flowchart of an example method 300 for executing a computation for a connected vehicle according to some implementations. One or more of the steps described herein for the method 300 may be executed by a mapping optimizer.

At step 301, a query may be received. The query may include one or more computations. The one or more computations may be related to a problem. For example, the one or more computations may be related to a mapping problem. Execution of the one or more computations may provide a solution to the mapping problem. The query may be received from a network.

In some implementations, a mapping problem may be related to which of a set of ECUs present in a vehicle will execute an operation for the vehicle. A solution for the mapping problem may select one of the ECUs from the set and assign the selected ECU the responsibility of executing the operation. See, for example, FIG. 6.

At step 304, a location of the one or more computations may be evaluated. For example, a determination may be made regarding whether the one or more computations will be executed by a higher level in the hierarchy. The determination may be made based in part on the requirements of the computation in terms of (1) computational power recommended or needed for the one or more computations (e.g., based at least in part on a computation type 605 as described below for FIG. 6) and (2) a timing requirement for the one or more computations (e.g., based on the timing requirement for the computation type 610 as described below with reference to FIG. 6). See, for example, FIGS. 4 and 6.

At step 305, a determination may be made regarding whether the one or more computations will be pushed to a higher level in the hierarchy.

In some implementations, if a determination is made to push the one or more computations to a higher level in the hierarchy, then the query may be forwarded to the network. Another manager associated with the higher level may receive the query and proceed with the method 300 from step 301.

In some implementations, if a determination is made to not push the one or more computations to a higher level in the hierarch, then the method 300 may proceed to step 307. For example, the determination may indicate that the one or more computations will be executed at the present level in the hierarchy.

At step 307, the one or more computations may be executed. Execution of the one or more computations may yield a solution to a problem. For example, execution of the one or more computations may provide a mapping solution to a mapping problem.

At step 309, a home bit may be analyzed to determine which vehicle originated the query received at step 301.

At step 311, a solution may be provided to a network. The solution may include message provided to a wireless network. The solution may be addressed to the vehicle that originated the query as indicated by the home bit included in the query. This vehicle may receive the solution from the network.

In some implementations, a method may include executing a computation for a vehicle using a hierarchy of processor-based computing devices that are available to the vehicle. For example, the method may include: identifying one or more computations as being un-executable by a processor-based computing device of the vehicle; generating a query including query data describing the one or more computations to be executed for the vehicle; providing the query to a network; and receiving a response from the network, where the response includes solution data describing a result of executing the one or more computations and the response including the solution data describing the result was provided to the network by a processor-based computing device included in a hierarchy of processor-based computing devices that include greater computational ability than the processor-based computing device of the vehicle. Other embodiments of this aspect include corresponding computer systems, apparatus, and computer programs recorded on one or more computer storage devices, each configured to perform the actions of the methods.

In some implementations, the one or more computations are identified as being un-executable by the method because they exceed a computational ability of the processor-based computing device of the vehicle. For example, the one or more computations may be too computationally expensive to be executed by the processor-based computing device of the vehicle. Research indicates that in the future mapping problems as described herein will be too complex to be executed by the processor-based computing devices that are economically feasible for inclusion in a vehicle design.

In some implementations, the one or more computations are identified as being un-executable because they cannot be executed by the processor-based computing device of the vehicle within a timing threshold associated with the one or more computations. For example, by the time the one or more processor-based computing devices of the vehicle successfully executed the one or more computations the timing threshold would be exceeded.

In some implementations, the hierarchy includes a plurality of layers and each successive layer includes greater computational ability than one or more preceding layers in the hierarchy. In some implementations, the hierarchy is only available to vehicles having a particular manufacturer associated with the vehicle. For example, the hierarchy is only available to those vehicles manufactured by Toyota or including one or more components manufactured by a particular OEM. In some implementations, the query may include one or more bits of data that indicate the manufacturer associated with the vehicle, thereby providing the vehicle with access to the hierarchy.

Figure 4:
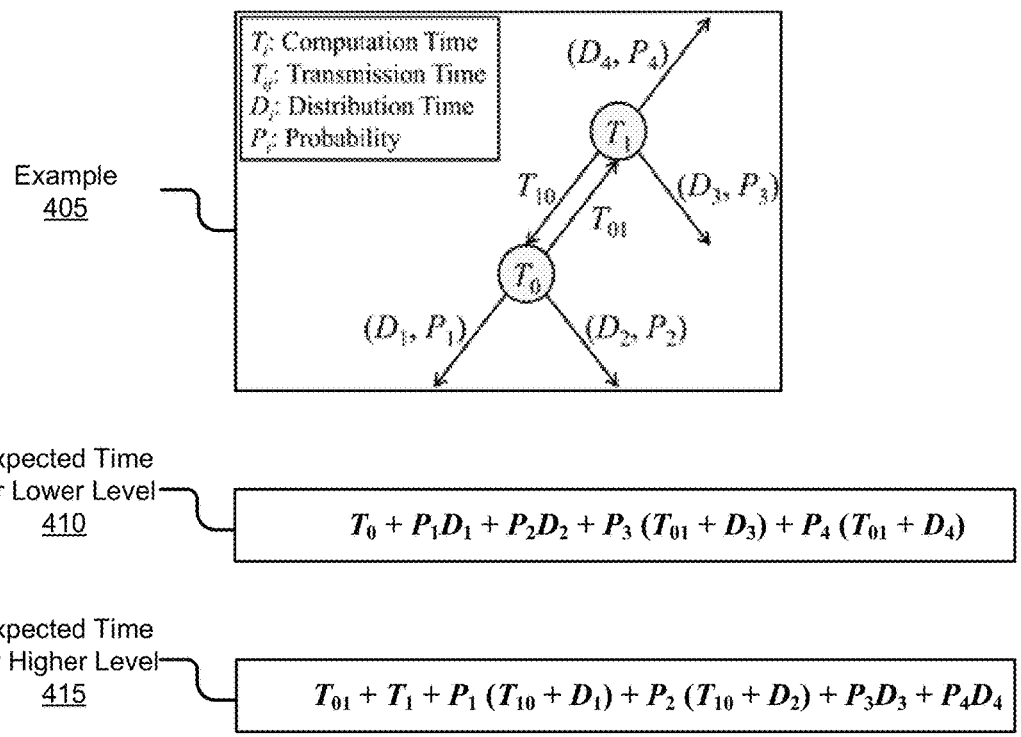
FIG. 4 is a block diagram illustrating a timing analysis for a computation according to some implementations.

Referring now to FIG. 4, depicted is a block diagram illustrating a timing analysis 499 for a computation according to some implementations.

A manager may determine a location of one or more computations included in a query based at least in part on a timing requirement for the one or more computations by performing a timing analysis 499. The timing requirement for one or more computations may be described by the analysis data structure 298.

In some implementations, the timing analysis 499 may depend at least in part on the computational ability of one or more processor-based computing devices available at the present level of the manager either (1) individually for each of the processor-based computing device at the present level or (2) in aggregate among a set of the processor-based computing devices at the present level.

In some implementations, the timing analysis 499 may depend at least in part on an overhead of communication between one or more processor-based computing devices either (1) at the present level or (2) inclusive of those processor-based computing devices present at the vehicle which originated the query as well.

In some implementations, the timing analysis 499 may depend at least in part on an estimation of a future location of the vehicle and the availability of wireless connectivity resources present at the future location (e.g., if the vehicle is present in a tunnel or in a parking garage then it may not have access to a wireless network or some other wireless connectivity resource; other circumstances may also prevent access to a wireless network or some other wireless connectivity resource). It also depends on the moving prediction of the vehicle. The estimation of the future location of the vehicle may beneficially have increased accuracy by basing this estimation on DSRC-compliant location data for the vehicle.

In some implementations, the timing analysis 499 may depend on a combination of one or more of the following as described above in the preceding paragraphs: (1) the computational ability of one or more processor-based computing devices available at the present level of the manager; (2) the overhead of communication between one or more processor-based computing devices; and (3) the estimation of the future location of the vehicle.

Example 405 depicts an example of a timing analysis problem to be solved by a manager such as the manager 199 described above for FIG. 2.

Figure 5:
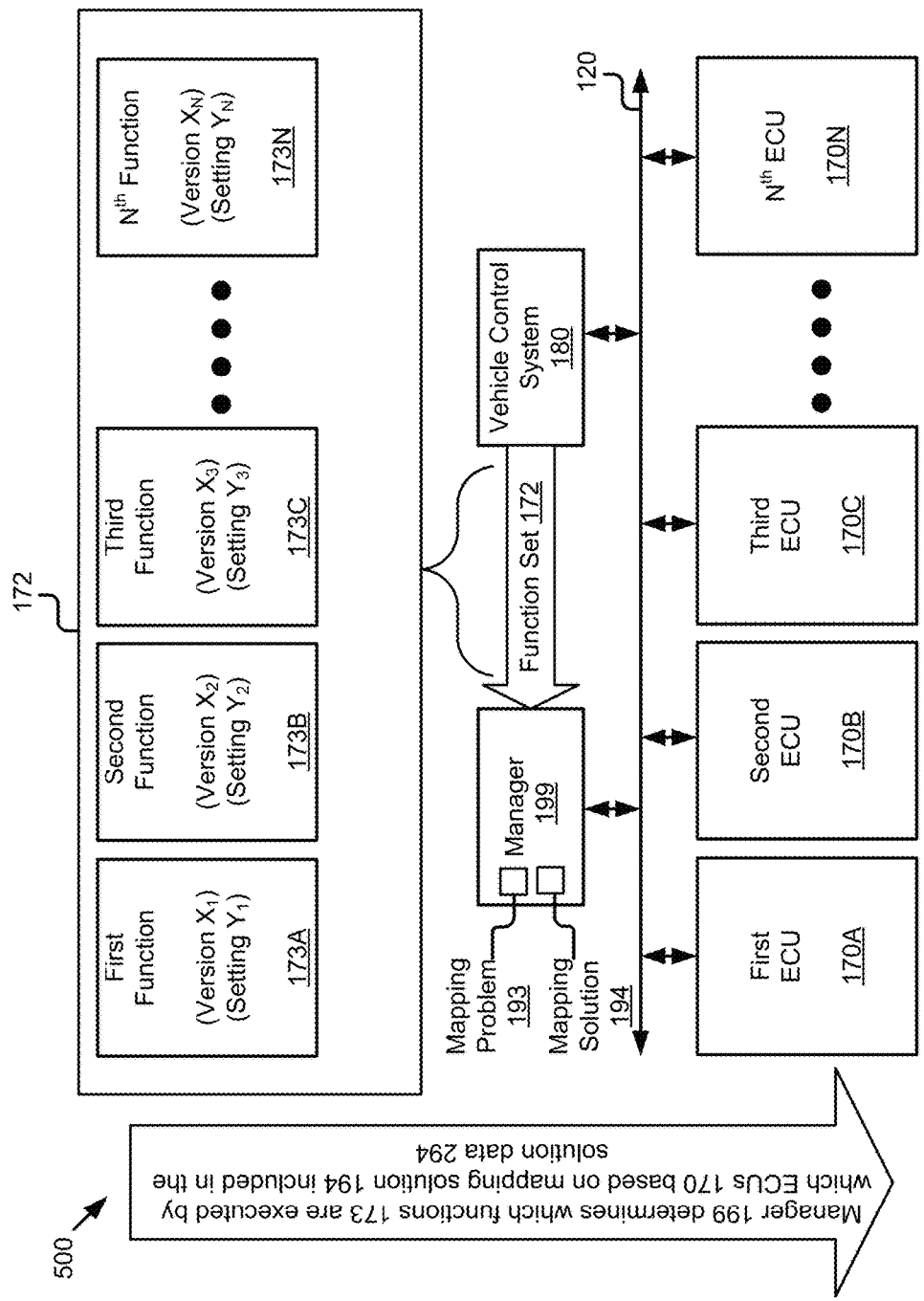
FIG. 5 is a block diagram illustrating an example of a computer system mapping a function set to a plurality of electronic control units according to some implementations

In some implementations, $T_0$ may represent the computation time for the present level in the hierarchy (e.g., level 1) to execute one or more computations included in a query or otherwise identified (e.g., in a function set as shown in FIG. 5). For example, $T_0$ may describe an estimate of how long it would take one or more processor-based computing devices at level 1 to execute the one or more computations.

In some implementations, $T_1$ may represent the computation time for a higher level in the hierarchy (e.g., level X, where "X" is any positive whole number greater than one) to execute the one or more computations. For example, $T_1$ may describe an estimate of how long it would take one or more processor-based computing devices at level X to execute the one or more computations.

In some implementations, $T_{01}$ may represent an amount of time it would take the present level (e.g., level 1, more generally any lower level in the hierarchy) to transmit a query including the one or more computations to level X (e.g., or more generally, any higher level in the hierarchy).

In some implementations, $T_{10}$ may represent an amount of time it would take a manager of a higher level in the hierarchy to transmit a response to the query to a manager of the lower level.

The response may be transmitted to the vehicle via one or more paths. A path may include a set of nodes in the wireless network which a message may be relayed to before arriving at its destination, e.g., the vehicle or some other node of the wireless network. An example of a node may include one or more servers, ECUs or other processor based computing devices as described above for FIG. 1A (e.g., second level server 102, third level server 103 . . . Nth level server 104, etc.).

In some implementations, a distribution time, D, may refer to an amount of time required to transmit a response to a query along any particular path. In some implementations, a probability, P, may refer to a probability that the vehicle receives a response through a corresponding path.

Element 410 may describe an expected time required to execute one or more computations at a lower level (e.g., level 1).

Element 415 may describe an expected time required to execute the same one or more computations at a higher level (e.g., level X).

The manager for the present level (i.e., the level described by element 410) may have access to all the information needed to determine elements 410 and 415. The manager may also have access to other information such as the timing requirement for the one or more computations and the computational requirements for the one or more computations. Using this information, the manager may determine whether to execute the one or more computations at the present level or the higher level.

For example, it may be recommended to execute the one or more computations at the higher level because of the computational requirements of the one or more computations. However, if there is not enough time to do so (as indicated by element 415 relative to the timing requirement for the one or more computations) and the one or more computations are capable of being executed at the present level (e.g., based on the computational ability of the present level relative to the computational requirements of the one or more computations) within the timing requirement for the one or more computations (as indicated by element 410 relative to the timing requirement for the one or more computations), then the manager may determine that the one or more computations will be executed at the present level in the hierarchy.

Referring now to FIG. 5, a block diagram illustrating an example of a computer system 500 mapping a function set 172 to a plurality of ECUs 170A, 170B, 170C . . . 170N is depicted according to some implementations.

In some implementations, the computer system 500 may include a special-purpose computer system that is programmed to provide the functionality described herein. In some implementations, the computer system 500 may include the vehicle 123. In some implementations, the computer system 500 may include any processor-based computing device of the vehicle 123. For example, the computer system 500 may be an onboard vehicle computer of the vehicle 123.

The computer system 500 may include one or more of the following elements: the manager 199; a vehicle control system 180; and a plurality of ECUs 170A, 170B, 170C . . . 170N. These elements of the computer system 500 may be communicatively coupled to the bus 120.

The plurality of ECUs 170A, 170B, 170C . . . 170N may be elements of an ECU set. For example, the vehicle 123 may include a plurality of ECUs as shown in FIG. 5. The "N" in "ECU 170N" may indicate that the ECU set may include any positive whole number of ECUs 170A, 170B, 170C . . . 170N. The plurality of ECUs 170A, 170B, 170C . . . 170N may be referred to as "ECU 170" in the singular or "ECUs 170" collectively.

In some implementations, a vehicle control system 180 may include an advanced driver assistance system (e.g., an ADAS system).

In some implementations, the vehicle control system 180 may include the software or hardware that make a vehicle be an autonomous vehicle.

In some implementations, the vehicle control system 180 may generate a function set 172. The function set 172 may include a plurality of functions 173A, 173B, 173C . . . 173N. The "N" in "function 173N" may indicate that the function set 172 may include any positive whole number of functions 173A, 173B, 173C . . . 173N. The functions 173A, 173B, 173C . . . 173N may be referred to as "function 173" in the singular or "functions 173" collectively.

In some implementations, the manager 199 may determine a presence of a mapping problem 193 based on identifying a presence of the function set 172. For example, the function set 172 may include new functions not previously identified by the manager 199.

The mapping problem 193 may include a question or lack of information regarding which of the ECUs 170 should execute the different functions 173 of the function set 172. For example, the manager 199 may not know one or more of the following: which of the ECUs 170 should execute the first function 173A; which of the ECUs 170 should execute the second function 173B; which of the ECUs 170 should execute the third function 173C; or which of the ECUs 170 should execute the Nth function 173N.

In some implementations, the manager 199 may generate a query including the mapping problem 193. The mapping problem 193 may be described by the query data included in the query. The mapping problem 193 may include data that describes one or more of the following: (1) the function set 172; (2) a version associated with the function set 172; (3) a hardware platform associated with the function set 172; and (4) a setting associated with the hardware platform associated with the function set. The manager 199 may transmit the query to the network described above with reference to FIG. 1A.

In some implementations, the manager 199 may receive a response to the query from the network.

The response may be received in real time or substantially real time relative to the transmission of the query. In some implementations, the response is received within a period of 5 milliseconds and 1 minute of when the query is transmitted to the network 105. In some implementations, the response is received within 10 milliseconds of the query being transmitted to the network 105. In some implementations, the response is received within 1 second of the query being transmitted to the network 105. In some implementations, the response is received within 5 seconds of the query being transmitted to the network 105. In some implementations, the response is received within 1 minute of the query being transmitted to the network 105. In some implementations, the response is received within 5 minutes of the query being transmitted to the network 105.

The response may include the mapping solution 194. The mapping solution may be described by the solution data included in the response. The mapping solution 194 may describe which of the ECUs 170 should execute which of the functions 173. The manager 199 may map a function 173 to an ECU 170 based on the mapping solution 194. This process may be repeated for each of the functions 173 included in the function set 172.

In some implementations, the functions 173 are mapped to the ECUs 170 within a period of 5 milliseconds and 1 minute of when the query is transmitted to the network 105. In some implementations, the mapping is completed within 10 milliseconds of the query being transmitted to the network 105. In some implementations, the mapping is completed within 1 second of the query being transmitted to the network 105. In some implementations, the mapping is completed within 5 seconds of the query being transmitted to the network 105. In some implementations, the mapping is completed within 1 minute of the query being transmitted to the network 105. In some implementations, the mapping is completed within 5 minutes of the query being transmitted to the network 105.

Although not depicted in FIG. 5, the computer system 500 may include one or more processors such as the processor 225 described below with reference to FIG. 2. The processor may execute the manager 199 or the vehicle control system 180. The processor may control the operation of the manager 199 or the vehicle control system 180.

In some implementations, the computer system 500 may include a non-transitory memory such as the memory 227 or the storage 241 described above with reference to FIG. 2. The non-transitory memory may store one or more of the following: the function set 172; digital data describing the mapping problem 193; digital data describing the mapping solution 194; the manager 199; and the vehicle control system 180.

In some implementations, the non-transitory memory may be accessible by the processor so that the processor may, for example, execute the manager 199 or the vehicle control system 180 or access the digital data describing the mapping problem 193 or the mapping solution 194.

In some implementations, the computer system 500 may include a communication unit such as the communication unit 245 described above with reference to FIG. 2. For example, the computer system 500 may transmit the query including the mapping problem 193 to the network via the communication unit and receive the response including the mapping solution 194 via the network.

In some implementations, the mapping solution 194 may be provided in real time responsive to receipt of the mapping problem 193. For example, the mapping problem 193 may include a timing constraint where by the mapping solution 194 must be received in less than a few seconds or fractions of a second.

Figure 6:
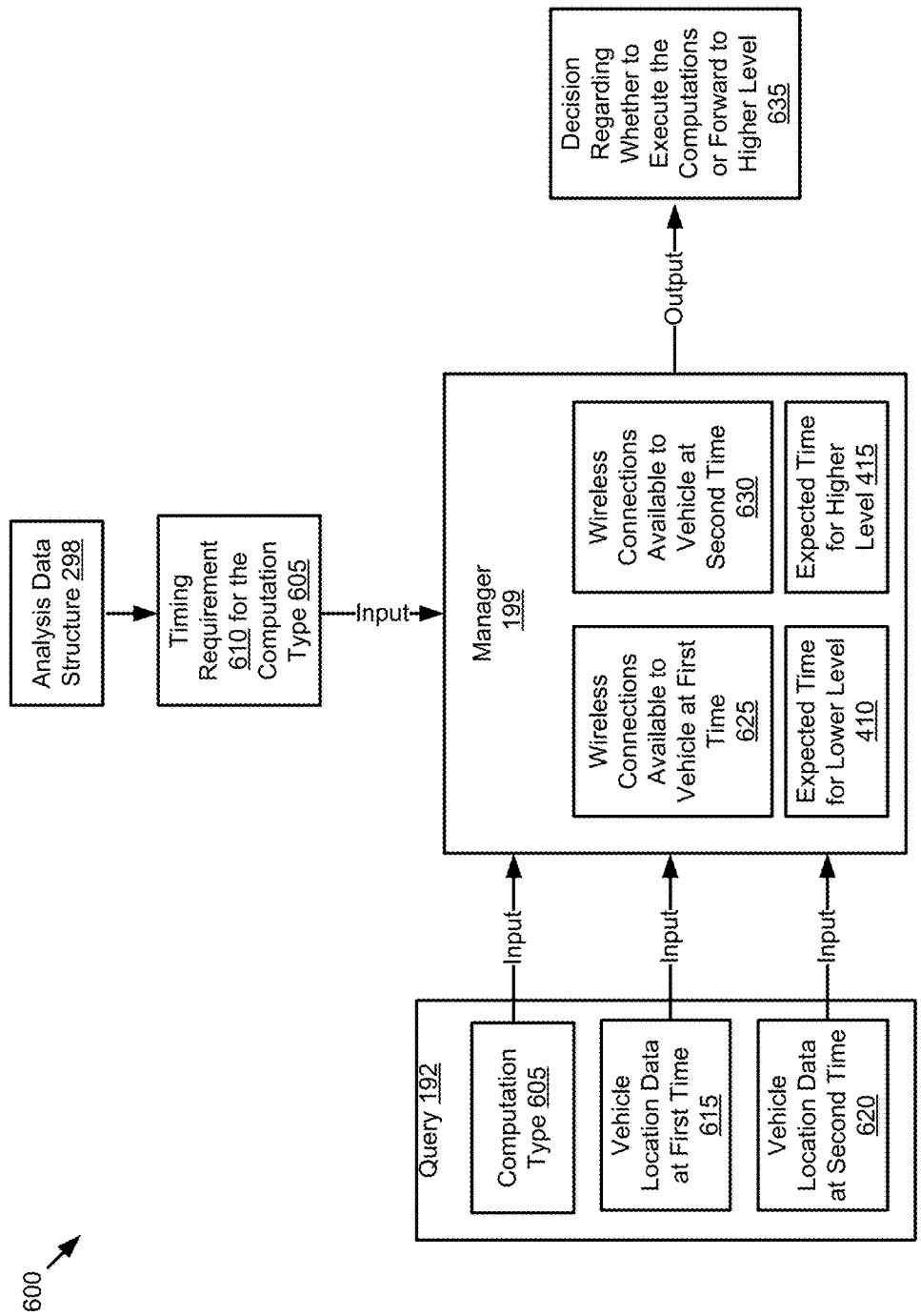
FIG. 6 is a block diagram illustrating a process flow for generating a decision regarding whether to execute a computation at present level or a higher level in a hierarchy according to some implementations.

Referring now to FIG. 6, depicted is a process flow 600 for generating a decision 635 regarding whether to execute a computation at present level or a higher level in a hierarchy according to some implementations.

In some implementations, the manager 199 may receive a plurality of inputs and output the decision 635 responsive to the plurality of inputs.

The plurality of inputs may include one or more of the following: a computation type 605 for a query; a timing requirement 610 for the computation type 605; vehicle location data at a first time 615; vehicle location data at a second time 620.

The following inputs may be included in a query 192: the computation type 605; the vehicle location data at a first time 615; and the vehicle location data at a second time 620.

In some implementations, the query 192 may include data that either describes the computation type 605 or may be used by the manager 199 to determine the computation type 605 based on the analysis data structure 298.

In some implementations, the vehicle location data at the first time 615 and the vehicle location data at the second time 620 may be DSRC-compliant because they are sourced from a DSRC-compliant GPS unit.

In some implementations, the query 192 may include the vehicle location data at the first time 615 as well as sensor data that describes the heading and the velocity of the vehicle 123. The manager 199 may then estimate the vehicle location data at the second time 620 based on the vehicle location data at the first time 615, the vehicle heading and the vehicle velocity. For example, if the starting position is known (the vehicle location at the first time 615), as well as the heading and magnitude of travel (vehicle velocity), then an estimate of the vehicle location at the second time 620 may be capable of calculation by the manager 199.

The analysis data structure 298 may include data that describes the wireless connectivity resources available to the vehicle at different locations. The manager 199 may retrieve data from the analysis data structure 298 that describes one or more of the following: the wireless connections available to the vehicle at the first time 625; and the wireless connections available to the vehicle at the second time 630. This data may be retrieved by the manager 199 from the analysis data structure 298 based on the vehicle location data at the first time 615 and the vehicle location data at the second time 620, respectively.

The analysis data structure 298 may include data that describes the timing requirement 610 for the computation type 605. The manager 199 may retrieve the timing requirement 610 from the analysis data structure 298 based on the computation type 605.

The manager 199 may determine an expected time for the lower level 410 and the excepted time for the higher level 415 based on one or more of the inputs.

The manager 199 may output a decision regarding whether to execution the one or more computations included in the query at the present level or whether to forward or push the one or more computations to a higher level.

In some implementations, the analysis data structure 298 may include data which explicitly describes which level of the hierarchy should execute the computation type 605 and the decision 635 may be based on this input to the manager 199.

Referring now to FIG. 1A, one or more of the following devices may be a communication device: a vehicle 123; a second level server 102; a third level server 103; and a Nth level server 104. Regarding U.S. patent application Ser. No. 14/471,387 filed on Aug. 28, 2014 and entitled "Full-Duplex Coordination System," in a half-duplex communication system, a first communication device currently transmitting data to a second communication device is not capable of simultaneously receiving data from the second communication device. If the second communication device has data to transmit to the first communication device, the second communication device needs to wait until the first communication device completes its data transmission. Only one communication device is allowed to transmit data at one time in the half-duplex communication system.

In a standard IEEE 802.11 Wireless Local Area Network (WLAN), communication devices may compete for access to a wireless channel based on the Carrier Sense Multiple Access with Collision Avoidance (CSMA/CA) Medium Access Control (MAC) protocol. The IEEE 802.11 MAC protocol requires that only one communication device may use the wireless channel to transmit data at one time. If two or more communication devices transmit data over the wireless channel at the same time, a collision occurs. As a result, only the communication device that currently gains access to the wireless channel may use the wireless channel to transmit data. Other communication devices having data to transmit need to monitor the wireless channel and may compete for access to the wireless channel when the wireless channel becomes idle again.

According to one innovative aspect of the subject matter described in this disclosure, the vehicle 123, the second level server 102 (and other communication devices as described above) may include a full duplex coordination system for implementing full-duplex wireless communications. The full duplex coordination system may include a processor and a memory storing instructions that, when executed, cause the full duplex coordination system to: create, at a first communication device (such as a vehicle 123, etc.), first data (such as a query 192 including query data 226) to transmit to a second communication device (such as a second level server 102, etc.); switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data (such as any combination of the data stored on the memory 227) from the second communication device using the wireless channel.

According to another innovative aspect of the subject matter described in this disclosure, a full duplex coordination system for implementing full-duplex wireless communications includes a processor and a memory storing instructions that, when executed, cause the full duplex coordination system to: receive a first portion of first data (such as any combination of the data stored on the memory 227) from a first communication device via a wireless channel; determine that a second communication device is a single destination of the first data based on the first portion of the first data; determine that the second communication device has second data (such as any combination of the data stored on the memory 227) to transmit to the first communication device; determine that the first communication device has full-duplex communication capability; switch a half-duplex operation mode of the second communication device to a full-duplex operation mode to activate the full-duplex operation mode of the second communication device; and transmit, in the full-duplex operation mode of the second communication device, the second data to the first communication device while simultaneously receiving a remaining portion of the first data from the first communication device using the wireless channel.

In general, another innovative aspect of the subject matter described in this disclosure may be embodied in methods that include: creating, at a first communication device, first data to transmit to a second communication device; switching a half-duplex operation mode of the first communication device to a full-duplex operation mode to activate the full-duplex operation mode of the first communication device; transmitting a first portion of the first data from the first communication device to the second communication device using a wireless channel; and transmitting, in the full-duplex operation mode of the first communication device, a remaining portion of the first data to the second communication device while simultaneously receiving second data from the second communication device using the wireless channel.

Yet another innovative aspect of the subject matter described in this disclosure may be embodied in methods that include: receiving a first portion of first data from a first communication device via a wireless channel; determining that a second communication device is a single destination of the first data based on the first portion of the first data; determining that the second communication device has second data to transmit to the first communication device; determining that the first communication device has full-duplex communication capability; switching a half-duplex operation mode of the second communication device to a full-duplex operation mode to activate the full-duplex operation mode of the second communication device; and transmitting, in the full-duplex operation mode of the second communication device, the second data to the first communication device while simultaneously receiving a remaining portion of the first data from the first communication device using the wireless channel.

Another innovative aspect of the subject matter described in this disclosure may be embodied in methods that include: determining first data to transmit from a first communication device to a second communication device; and transmitting, from the first communication device that operates in a full-duplex operation mode, the first data to the second communication device while simultaneously receiving second data from the second communication device using a common wireless channel.

Another innovative aspect of the subject matter described in this disclosure may be embodied in methods that include: receiving, from a first communication device, first data at a second communication device via a wireless channel; determining second data to transmit from the second communication device to the first communication device responsive to receiving at least a portion of the first data; and transmitting, from the second communication device that operates in a full-duplex operation mode, the second data to the first communication device using the wireless channel while simultaneously receiving the first data from the first communication device.

Another innovative aspect of the subject matter described in this disclosure may be embodied in methods that include: determining, at a first communication device, first data to transmit to a second communication device; switching the first communication device from a half-duplex operation mode to a full-duplex operation mode; transmitting, in the full-duplex operation mode of the first communication device, the first data to the second communication device while simultaneously receiving second data from the second communication device using the wireless channel; and switching the full-duplex operation mode of the first communication device to the half-duplex operation mode responsive to a determination that transmission of the first data completes.

Another innovative aspect of the subject matter described in this disclosure may be embodied in methods that include: receiving, from a first communication device, first data at a second communication device via a wireless channel; determining that the second communication device has second data to transmit to the first communication device; switching the second communication device from a half-duplex operation mode to a full-duplex operation mode; transmitting, in the full-duplex operation mode of the second communication device, the second data to the first communication device while simultaneously receiving the first data from the first communication device using the wireless channel; and switching the full-duplex operation mode of the second communication device to the half-duplex operation mode responsive to a determination that transmission of the second data completes.

Other aspects include corresponding methods, systems, apparatus, and computer program products for these and other innovative aspects.

These and other implementations may each optionally include one or more of the following operations and features. For instance, the features include: the first data including a first packet and the first portion of the first data including a header portion of the first packet; the remaining portion of the first data including a payload portion and a trailer portion of the first packet; determining that the second communication device is a single destination of the first data; activating the full-duplex operation mode of the first communication device responsive to the second communication device being the single destination of the first data; the first communication device and the second communication device being communication devices in a wireless local area network; determining that the first communication device operates in a regulated spectrum where full-duplex communication capability is required; receiving device registry data associated with the first communication device; determining that the first communication device has full-duplex communication capability based on the device registry data; and determining that the first communication device has full-duplex communication capability based on a capability indication field in the first portion of the first data, the capability indication field including data describing whether the first communication device has full-duplex communication capability.

For instance, the operations include: determining that the wireless channel is idle; and accessing the wireless channel for data communication between the first communication device and the second communication device based on a channel access rule.

The disclosure is particularly advantageous in a number of respects. For example, the system described herein is capable of achieving a higher throughput and a faster communication speed using full-duplex communication technologies rather than using half-duplex communication technologies. The full-duplex communication may be implemented between vehicles (e.g., communication systems installed in a vehicle 123 such as is depicted in FIG. 1A) or other communication devices that have full-duplex communication capability. In another example, the system coordinates communication between communication devices in a distributed way without using a central coordinator. The system determines a pair of communication devices and coordinates simultaneous transmission of data between the pair of communication devices so that the pair of communication devices may transmit data to each other simultaneously using the same wireless channel. Meanwhile, other communication devices may not transmit data over the wireless channel to avoid collision. The advantages of the system described herein are provided by way of example, and the system may have numerous other advantages.

The disclosure includes a system and method for implementing full-duplex wireless communications between communication devices. A full-duplex coordination system may include a processor and a memory storing instructions that, when executed, cause the full-duplex coordination system to: create, at a first communication device, first data to transmit to a second communication device; switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data from the second communication device using the wireless channel.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computer system that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A system comprising:
a first manager of a vehicle that is stored on a first memory and executable by one or more first processors, the first manager being operable to generate a query including query data describing a mapping problem including one or more questions about which of one or more electronic control units of the vehicle should execute one or more functions of the vehicle, wherein the first manager is communicatively coupled to a network and transmits the query to the network; and
a second manager of a server that is stored on a second memory and executable by one or more second processors, the second manager being communicatively coupled to the network and operable to receive the query including the query data and determine solution data describing a mapping solution for the mapping problem described by the query data;
wherein the second manager is present in a hierarchy of extra-vehicle computational units that are available to the vehicle when the first manager identifies the mapping problem which is not capable of being solved by any processor-based computing devices of the vehicle;
wherein the second manager is operable to determine whether to execute one or more computations described by the query data or forward the query to a higher level in the hierarchy to minimize a computational time based on a timing analysis that includes (1) determining a first time value describing how long it would take the server to transmit the query to the higher level and the vehicle to receive a response to the query from the higher level, (2) determining a second time value describing how long it would take for the server to provide the response to the vehicle and (3) comparing the first time value and the second time value to a timing requirement associated with the one or more computations to determine whether the one or more computations are executed or forwarded.

2. The system of claim 1, wherein the timing requirement includes a timing threshold that describes how quickly the response should be received by the vehicle.

3. A system comprising:
a first manager of a vehicle that is stored on a first memory and executable by one or more first processors, the first manager being operable to generate a query including query data describing one or more computations to be executed for the vehicle, wherein the first manager is communicatively coupled to a network and transmits the query to the network; and
a second manager of a server that is stored on a second memory and executable by one or more second processors, the second manager being communicatively coupled to the network and included in a hierarchy of devices that are available to execute computations for the vehicle;
wherein the second manager is operable to determine whether to execute the one or more computations described by the query data or forward the query to a higher level in the hierarchy to minimize a computational time based on a timing analysis that includes (1) determining a first time value describing how long it would take the server to transmit the query to the higher level and the vehicle to receive a response to the query from the higher level, (2) determining a second time value describing how long it would take for the server to provide the response to the vehicle and (3) comparing the first time value and the second time value to a timing requirement associated with the one or more computations to determine whether the one or more computations are executed or forwarded;
wherein, responsive to determining to execute the one or more computations, the second manager (1) executes the one or more computations, (2) determines solution data describing a result of executing the one or more computations, (3) generates the response that includes the solution data describing the result and (4) transmits the response to the network; and
wherein the first manager receives the response from the network.

4. The system of claim 3, wherein the vehicle is an autonomous vehicle and the one or more computations are associated with a vehicle control system that makes the vehicle autonomous.

5. The system of claim 3, wherein the vehicle includes an Advanced Driver Assistance System and the one or more computations are associated with the Advanced Driver Assistance System.

6. The system of claim 3, wherein the server is an element of a roadside unit.

7. The system of claim 3, wherein the response is received by the vehicle within a period of 5 milliseconds and 1 minute of when the query was transmitted to the network.

8. The system of claim 3, wherein the one or more computations are related to a mapping problem including one or more questions about which of one or more electronic control units of the vehicle should execute the one or more computations of the vehicle and execution of the one or more computations yields a mapping solution that describes which of the one or more electronic control units of the vehicle should execute the one or more computations of the vehicle.

9. The system of claim 8, wherein the first manager receives the response from the network that includes the mapping solution and the first manager maps the one or more computations to the one or more electronic control units as described by the mapping solution.

10. A computer program product comprising a non-transitory memory of a vehicle storing computer-executable code that, when executed by a processor of the vehicle, causes the processor to:

identify one or more computations as being un-executable by any processor-based computing device of the vehicle, wherein the one or more computations are identified as being un-executable because a server and not the vehicle would minimize a computational time based on a timing analysis that includes (1) determining a first time value describing how long it would take the server to transmit a query including query data describing the one or more computations to be executed for the vehicle to the higher level and the vehicle to receive a response to the query from the higher level, (2) determining a second time value describing how long it would take for the server to provide the response to the vehicle and (3) comparing the first time value and the second time value to a timing requirement associated with the one or more computations to determine whether the one or more computations are executed or forwarded;

generate the query including the query data describing the one or more computations to be executed for the vehicle;

provide the query to a network; and receive the response from the network, wherein the response includes solution data describing a result of executing the one or more computations and the response was provided by a processor-based computing device included in a hierarchy of processor-based computing devices that have greater computational ability than any processor-based computing devices of the vehicle.

11. The computer program product of claim 10, wherein the one or more computations are additionally identified as being un-executable because they exceed the computational ability of each of the processor-based computing devices of the vehicle.

12. The computer program product of claim 10, wherein the one or more computations are identified as being un-executable because minimizing the computational time includes determining that the one or more computations cannot be executed by any of the processor-based computing devices of the vehicle within a timing threshold associated with the one or more computations.

13. The computer program product of claim 10, wherein the one or more computations are associated with a vehicle control system of the vehicle.

14. The computer program product of claim 10, wherein the response is received by the vehicle within a period of 5 milliseconds and 1 minute of when the query was transmitted to the network.

15. The computer program product of claim 10, wherein the response is received by the vehicle within a period of 5 milliseconds and 1 minute of when the one or more computations were identified.

16. A method of executing a computation for a vehicle using a hierarchy of processor-based computing devices that are available to the vehicle, the method comprising:

identifying one or more computations as being un-executable by a processor-based computing device of the vehicle, wherein the one or more computations are identified as being un-executable because a server and not the vehicle would minimize a computational time based on a timing analysis that includes (1) determining a first time value describing how long it would take the server to transmit a query including query data describing the one or more computations to be executed for the vehicle to the higher level and the vehicle to receive a response to the query from the higher level, (2) determining a second time value describing how long it would take for the server to provide the response to the vehicle and (3) comparing the first time value and the second time value to a timing requirement associated with the one or more computations to determine whether the one or more computations are executed or forwarded;

generating the query including the query data describing the one or more computations to be executed for the vehicle;

providing the query to a network; and receiving the response from the network, wherein the response includes solution data describing a result of executing the one or more computations and the response including the solution data describing the result was provided to the network by a processor-based computing device included in a hierarchy of processor-based computing devices that have greater computational ability than the processor-based computing device of the vehicle.

17. The method of claim 16, wherein the one or more computations are additionally identified as being un-executable because they exceed the computational ability of the processor-based computing device of the vehicle.

18. The method of claim 16, wherein the one or more computations are additionally identified as being un-executable because minimizing the computational time includes determining that the one or more computations cannot be executed by the processor-based computing device of the vehicle within a timing threshold associated with the one or more computations.

19. The method of claim 16, wherein the hierarchy includes a plurality of layers and each successive layer includes greater computational ability than one or more preceding layers in the hierarchy.

20. The method of claim 16, wherein the hierarchy is only available to vehicles having a particular manufacturer associated with the vehicle.

21. The method of claim 20, wherein the manufacturer is an original equipment manufacturer that is associated with the vehicle because it manufactured a component of the vehicle.

22. The method of claim 20, wherein the query includes one or more bits of data that indicate the manufacturer associated with the vehicle, thereby providing the vehicle with access to the hierarchy.

\* \* \* \* \*